United States Patent [19]

Francioni

[11] Patent Number: 4,991,708
[45] Date of Patent: Feb. 12, 1991

[54] APPARATUS FOR FORMING GROUPS OF ARTICLES, PARTICULARLY FOR AUTOMATIC PACKAGING LINES

[75] Inventor: Renzo Francioni, Prato Sesia, Italy
[73] Assignee: Cavanna S.p.A., Prato Sesia, Italy
[21] Appl. No.: 281,098
[22] Filed: Dec. 7, 1988
[30] Foreign Application Priority Data
  May 18, 1988 [IT] Italy ............... 67460 A/88
[51] Int. Cl.$^5$ ............................................. B65G 47/26
[52] U.S. Cl. ................... 198/419.2; 198/430
[58] Field of Search ............... 198/460, 461, 428, 429, 198/430, 419.2, 419.3

[56] References Cited

U.S. PATENT DOCUMENTS

| | | | |
|---|---|---|---|
| 3,485,339 | 12/1969 | Miller et al. | 198/460 |
| 3,908,333 | 9/1975 | Cavanna | 198/461 X |
| 4,182,442 | 1/1980 | Jones | 198/430 X |
| 4,190,146 | 2/1980 | Knuchel | 198/461 X |
| 4,640,408 | 2/1987 | Eaves | 198/460 |
| 4,715,114 | 12/1987 | Yajima | 198/430 X |
| 4,717,013 | 1/1988 | Reissmann et al. | 198/460 X |
| 4,768,642 | 9/1988 | Hunter | 198/429 X |
| 4,815,581 | 3/1989 | Deutschländer | 198/461 |

FOREIGN PATENT DOCUMENTS

| | | |
|---|---|---|
| 2354738 | 7/1975 | Fed. Rep. of Germany . |
| 2516488 | 5/1983 | France . |
| 967479 | 3/1975 | Italy . |
| 55-2521 | 1/1980 | Japan .................................. 198/460 |
| 206719 | 9/1986 | Japan .................................. 198/461 |
| 1412679 | 9/1973 | United Kingdom . |
| 2111247 | 11/1982 | United Kingdom . |
| 2129754 | 5/1984 | United Kingdom . |

Primary Examiner—Joseph E. Valenza
Assistant Examiner—Cheryl E. Gastineau
Attorney, Agent, or Firm—Christie, Parker & Hale

[57] ABSTRACT

A line for the positive conveyance of packaged articles (for example food products) extends in correspondence with a removal station at which groups of a predetermined number of the articles must be brought to a substantially stationary condition for a predetermined time interval. The duration of this interval is such as to enable the operation of a removal unit, such as a manipulator, a robot, etc. The conveyor line operated intermittently with a condition in which it is substantially stationary during the removal period and a condition of movement in which the line advances by a number of positions equal to the number of articles in each group. The articles, which are supplied in a substantially but not necessarily continuous flow, are accumulated, using a spacer conveyor upstream of the batching conveyor which supplies the conveyor line. The conveyors in question also move intermittently in synchronism with the movement of the conveyor line. The articles are accumulated upstream of the batching conveyor using a further conveyor which is in continuous motion and on which the articles are transported with the ability to slide.

18 Claims, 1 Drawing Sheet

APPARATUS FOR FORMING GROUPS OF ARTICLES, PARTICULARLY FOR AUTOMATIC PACKAGING LINES

BACKGROUND OF THE INVENTION

The present description relates to apparatus for supplying groups of articles, each including a predetermined number of the articles, to a station which is constituted, for example, by a removal station, at which a unit, such as, for example, an industrial robot or manipulator, operates.

The requirement to provide apparatus of this type is experienced, for example, in automatic packaging lines, such as lines for the automatic packaging of food products.

In these lines, the "unwrapped" products (that is without packaging) are sent in a substantially continuous flow to packaging machines which wrap them in a wrapper, for example of the type currently known as a "flow pack".

These packages, with the products inside them, are then collected in groups for insertion in containers such as boxes or flow packs of larger dimensions.

Their transfer to these further containers can be achieved by means of removal units (for example ejectors or manipulators, which may also take the form of robots or automatons) which can remove one or more groups of articles intermittently.

In general, it is difficult to operate these removal units with a flow of articles in continuous movement, particularly when a fast rate of working is required. The removal unit (one is thinking, for example, of an ejector unit or a manipulator) usually has a finite operating time which does not reconcile well with the fact that the products which are to be removed are in continuous movement. It may then be necessary to make the removal unit capable, to a certain extent, of following the movement of the products which are presented at the removal station. This, however, makes the design and production of such a unit to achieve reliable operation very complex, to the extent that its use at fast working rates, is, in fact, prohibitive.

The problem is made even more complicated by the fact that the articles in the flow of products fed to the removal station (for example the flow of articles discharged from a packaging station of the flow-pack type) may not be uniformly spaced, partly because of the discarding of incorrectly-packaged articles and partly because of chains of articles which are packaged correctly individually but which are connected together undesirably as a result of their imperfect separation at the output of the packaging station.

One is thus dealing, in the terms used in the present description and in the claims which follow, with a "substantially, but not necessarily continuous" flow of articles.

SUMMARY OF THE INVENTION

The present invention is based of the observation that the problems inherent in the removal of groups of articles by a unit such as an ejector, a manipulator, a robot, etc. can be simplified greatly if the groups of articles to be removed can be supplied to the removal station in a condition in which they are substantially stationary for a predetermined period of time which corresponds to the period necessary to enable the removal unit to operate correctly.

The subject of the present invention is therefore an apparatus for supplying a station, from a substantially but not necessarily continuous flow of articles, with groups including a predetermined number of the articles which, for a predetermined period of time are substantially stationary in correspondence with the station, characterised in that it comprises:

a conveyor line for the articles, which extends in correspondence with the station and has respective positions for receiving the articles; the conveyor line having associated drive means which can cause its intermittent movement with a condition in which it is substantially stationary for the predetermined period and a condition of movement in which the conveyor line advances by a number of receiving positions which is equal to the number of articles in each group, a conveyor for the batched supply of the articles to the conveyor line; the conveyor also being able to move with an intermittent motion which copies the intermittent motion of the conveyor line, with associated means for linking its movement to that of the conveyor line for regulating the supply of articles to the receiving positions of the conveyor line itself, and a unit for accumulating the articles located upstream of the batching conveyor for generating, from the flow of articles, an accumulation of articles which are supplied continuously to the batching conveyor, wherein the conveyor line includes a first plurality of separate conveying elements arranged parallel to each other so as to define separating spaces between them and a spacer conveyor which is provided immediately upstream of the first plurality of separate conveying elements and is constituted by a second plurality of separate conveying elements arranged parallel to each other and extending, at least marginally, into the separating spaces.

BRIEF DESCRIPTION OF THE DRAWINGS

The invention will be described below, purely by way of non-limiting example, with reference to the appended drawings, in which.

DETAILED DESCRIPTION OF THE PREFERRED EMBODIMENTS

Figure 1:
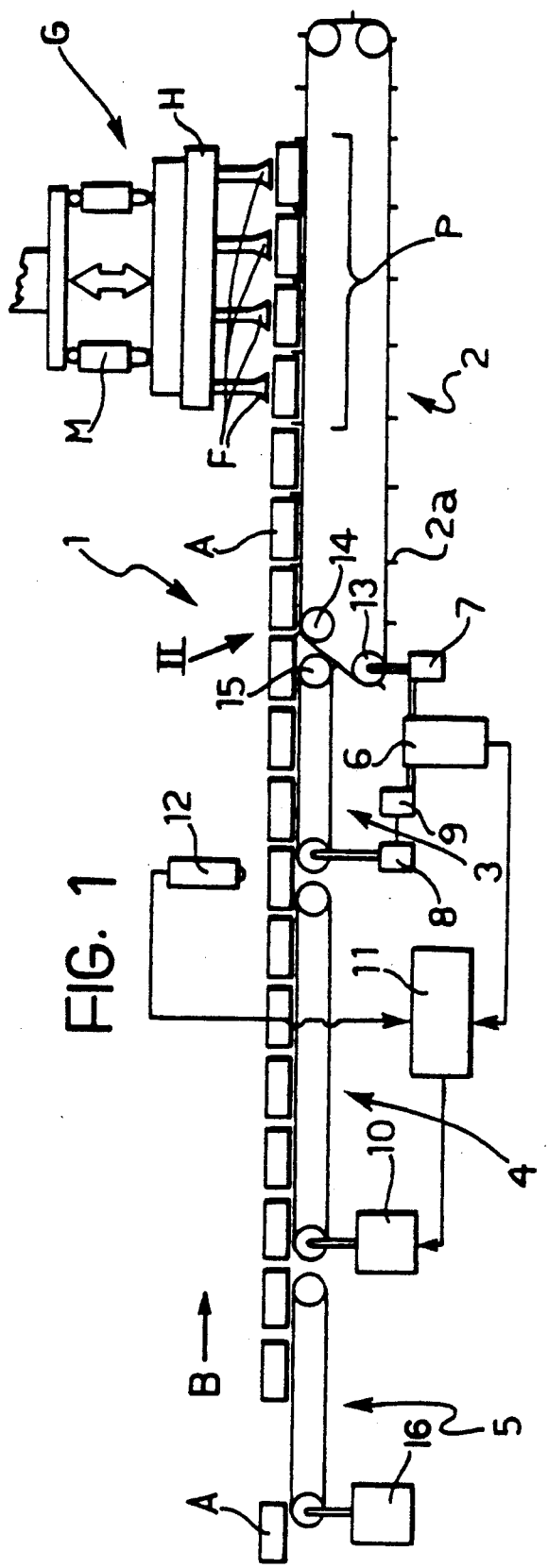
FIG. 1 is a schematic side-elevational view of apparatus according to the invention.

In the drawings apparatus for forming groups of articles, intended for use, for example, with an automatic packaging line, for example a line for the automatic packaging of food products, is generally indicated 1.

By way of reference, it may be imagined that the apparatus 1 is arranged downstream of a packaging machine (not illustrated) of any known type, which outputs a substantially but not necessarily continuous flow of articles A. The articles in question may, for example, be confectionery products (bars of chocolate, tartlets, etc) of generally prismatic shape, wrapped in flow-pack type wrappers and advanced transversely (that is with their longer sides transverse to the direction of advance) from left to right (arrow B) with reference to FIG. 1.

With regard to the meaning of the term "substantially but not necessarily continuous", relating to the flow of articles A, reference should be made to the terminological statement made in the introduction to the present description.

The articles A are to be transferred to a removal unit or station G whose function is to remove the articles A from the apparatus, the articles being collected in groups each including a predetermined number of articles A.

By way of example, it is assumed that the unit G is constituted by an automaton or robot with a "hand" H provided with five vacuum-lifting members (suction cups) F, aligned in the direction of advance of the articles A.

The hand H of the robot is movable vertically relative to the apparatus by means of actuators M, thus enabling the gripping members F to pick up a group of articles A and then raise them before transferring them to a packing station (not shown) or another working station.

The structure and operating criteria of the unit or station G (here shown purely as an example of the numerous possible variants) should be considered as known and are not in any case important for an understanding of the present invention.

For this purpose, it will suffice to note that the unit G has, in general, an operating, or pick-up time ($T_s$) which is predetermined and can be varied within quite wide limits in dependence on the specific requirements of application.

The apparatus 1 according to the invention has the primary function of ensuring that the articles A which come from the upstream station (for example a packaging machine) can be transferred to the region (generally indicated P) in which the pick-up unit G acts in such a manner that each group of articles A intended to be taken up by the unit G stops (or at any rate reduces its speed to a minimum) in correspondence with the region P for the time interval ($T_s$) necessary to allow the correct operation of the pick-up unit G.

In the embodiment of the invention to which FIG. 1 relates, this result is achieved by means of four endless conveyors (loops) arranged in cascade, that is, taken in the direction of advance of the articles A, from the downstream end to the upstream end:

a positive-drive line (or chain) 2 for the articles A, provided, according to a widely known solution, with nibs (or blades or dogs) 2a which can push the articles A as a result of the movement of the chain 2 and pairs of which jointly define respective positions or receptacles for receiving the articles A, a spacer belt 3, whose movement is strictly subservient to that of the chain 2 so that it can be considered virtually as forming an integral part of the chain 2 itself, a belt 4 (batching belt) for the batched supply of articles A, and an accumulator belt 5.

All the conveyors 2 to 5 are made—as stated—in the form of endless-loop conveyors and their ends therefore pass round respective transmission rollers or pulleys. Since endless loop conveyors are widely known, specific reference numerals have not been attributed to most of the parts in the appended drawings.

The positive-drive line or chain 2 (constituted, as will better be seen below, by a plurality of chains side by side) is driven by a motor 6 through a respective transmission 7.

The same motor 6 drives the spacer belt 3 through a transmission 8 and a multiplier unit 9.

The batching belt 4 is driven by a respective motor 10 whose movement is made subservient to the movement of the motor 6 of the chain 2 through a control unit 11 which is connected to an optical detector 12 which can signal to the unit 11 the passage of each article A from the batching belt 4 to the spacer belt 3.

The criteria which regulate the operation of the control unit 11, whose function is to subject the movement of the regulator belt 4 to the movement of the chain 2, are known and are described, for example, in Italian Pat. No. 967 479 and in the corresponding British Pat. No. 1 412 679, both in the name of the same Applicants.

The movement of the accumulator belt or conveyor 5 is driven by a respective motor 16 whose rate of rotation is generally linked to that of the other movable elements of the device 1.

Figure 2:
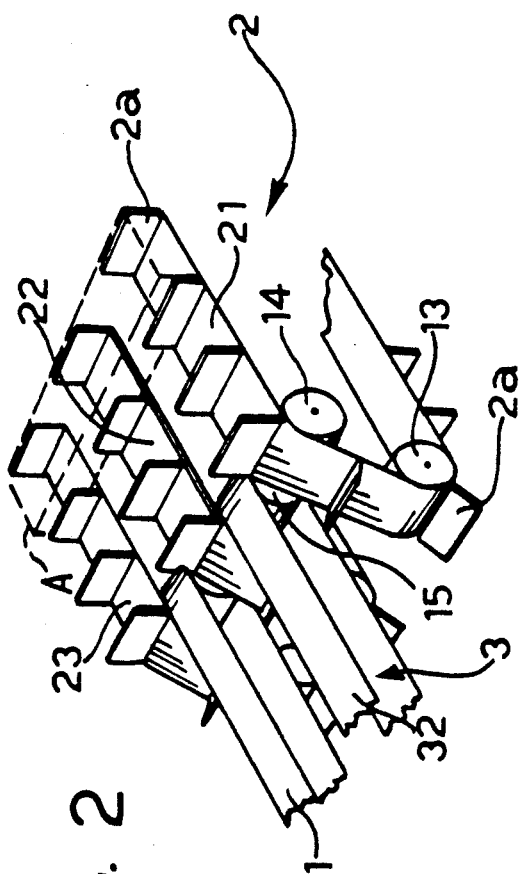
FIG. 2 is a perspective view showing the structure of that portion of the apparatus according to the invention indicated by the arrow II in FIG. 1, in greater detail.

As can better be seen in the perspective view of FIG. 2, the chain 2 is actually constituted by three identical chains 21, 22, 23, located side by side and substantially parallel to each other so that two separating spaces are defined between them. The upstream ends (that is, the ends facing the spacer belt 3) of the chains 21, 22, 23 pass round a pair of transmission assemblies 13, 14, constituted by rollers or pulleys with horizontal axes. The first transmission assembly 13 is located beneath the spacer belt or conveyor 3, whilst the second unit 14 is substantially coplanar with the group of transmission rollers or pulleys (indicated 15) around which the downstream end of the spacer belt 3 passes.

The latter is also constituted, in fact, by a pair of endless belts or conveyors 31, 31, which pass round respective transmission rollers. In particular, the downstream ends of the two belts 31, 32 extend into the two spaces separating the two outer chains 21, 23 from the chain 22 which is the central chain in the line 2.

The arrangement described is thus such that, when the apparatus is in operation, the articles A which pass from the spacer belt 3 to the positive-drive chain 2 are, so to speak, received by the nibs 2a of the chain 2 which rise up gradually from beneath the end or output portion of the conveyor 3. As a result, therefore, the articles A pass from the belt 3 to the chain 2 gradually, with the certainty that the articles A will be received securely in the receiving cells or positions defined by the pairs of nibs 2a (or more precisely by the pairs of rows of nibs 2a) arranged one downstream of the other on the periphery of the chain 2.

When the device is operating, the unit 11 activates the motor 6 of the chain 2 intermittently, that is with stationary (or substantially stationary) phases each lasting for a period of time $T_s$ (equal to the operating period of the unit G) alternating with phases of movement lasting for a period of time $T_m$. The latter period is selected so as to enable the chain 2 to advance by a number of positions equal to the number of articles A in each group to be taken up by the unit G.

In other words, in the example illustrated, the chain 2 advances intermittently in steps of five positions.

Thus after the take-up unit G has taken or ejected one group, for example of five articles, from the apparatus 1, the chain 2 advances so as to bring a new group of five articles A to the region P. These will be available for the unit G as soon as it returns to operate in correspondence with the region P.

The duration of the period of movement $T_m$ can, like the duration of the stationary period $T_s$ (selected so as to correspond with the operating period of the unit G), also be selected in dependence on the specific applicational requirements (for example so that it corresponds to the duration of the period of time necessary for the unit G to complete the transfer of the articles A taken from the device 1 to another packing and working station and then to return into alignment with the region P).

In any case, it is considered preferable for the duration of the movement period $T_m$ to be selected so that it is at least three times the duration of the pause period $T_s$. This is essentially to prevent the duration of the pause $T_s$ from having an excessive effect on the establishment of the average speed $V_m$ of advance of the chain 2 (and of the apparatus 1 as a whole).

The average speed $V_m$ of advance of the chain 2 is in fact defined by the equation $$V_m = \frac{T_m \cdot V}{T_s + T_m} \quad (1)$$

where $T_s$ and $T_m$ are the duration of the stationary (or take-up) period and the movement period of the chain 2 respectively, and V is the speed of advance of the chain 2 during the movement phase ($T_m$). The latter speed is generally definable, for example, in units of M/min where M is the length of each article A in the direction of advance.

It is naturally assumed in the above that (accelerating and braking phenomena being left out of consideration) the speed of the chain 2 during the stationary phases ($T_s$) is effectively zero.

A solution may, however, be envisaged, and is therefore included within the scope of the present invention, in which instead of complete stoppage during the period $T_s$ there is only a marked reduction in the speed of the chain 2, thus giving rise to an overall intermittent movement with a speed which varies approximately sinusoidally.

In the remainder of the description, however, reference will always be made to a solution in which the chain 2 stops completely during the period $T_s$.

The movement of the supply belt 4 is controlled by the unit 11 so as to copy the movement of the chain 2.

This means that the motor 10 also drives the conveyor belt 4 intermittently in alternating phases of stoppage (or substantial stoppage) and of movement.

As already stated, the movement of the conveyors such as the chain 2 and the batching belt 4 can easily be made subservient by means of known technical solutions currently used for linking the speeds of two belts or chains which move continuously. In particular reference may be made in this respect to the prior patents of the same Applicant already quoted above.

In this connection, the function of the optical detector 12, arranged in correspondence with the downstream ends of the batching belt 4 is to enable the unit 11 to link the speed of the belt 4 to that of the chain 2 but also to ensure that the belt 4 is driven in phase with the movement of the chain.

The purpose of the in-phase linking is to ensure that the articles A are transferred from the batching belt 4 to the chain 2 not only at the required speed (modulated intermittently as see above) but also so that the articles 4 are positioned correctly relative to the receiving cells defined by the nibs 2a of the chain 2.

In particular, the function of the optical sensor 12 is to detect the transit of the front edge (or similarly the rear edge) of each article A which is ejected from the batching belt 4 to pass onto the accelerator belt 3. It is thus possible by means of feedback to the motor 10 which drives the belt 4 to ensure that the articles A are presented in the correct positions relative to the nibs 2a of the chain 2.

This feedback is achieved by means of the presence of the spacer belt 3 whose average speed $V'_m$ (this movement also being intermittent, since the movement of the belt 3 is strictly subservient to that of the chain 2) is regulated so as to be faster than the average speed of advance of the chain 2.

For example, a choice which has been shown to be particularly advantageous is an adjustment of the ratio of the transmission 9 so that, during the movement phase, the spacer belt 3 moves at a speed such that $V'_m = 1.3 - 1.4$ times $V_m$.

This means, in particular, that the spacer belt 3 has a faster average speed than the batching belt 4.

The result of this faster speed is that the articles A (which, as will be seen below, are in contact with each other as they are transferred to the batching belt 4) are moved apart as they transfer on to the spacer belt 3.

This separating action has the dual purpose of creating successive spaces or gaps between the articles A so that the nibs 2a of the chain 2 can be inserted without difficulty and also of enabling the optical reader 12 located at the downstream end of the batching belt 4 to detect the edges of the articles A clearly. This detection would be virtually impossible if it had to be carried out on articles A which were bearing against each other.

Both the batching belt 4 and the spacer belt 3 have outer surfaces (that is those which define the top faces of the passes which transport the articles A) which are of a material, for example a silicone material, which prevents the articles A from sliding freely on the belts.

Whilst not having a fully-positive conveying action as in the case of the chain 2 provided with the nibs 2a, both the batching belt 4 and the spacer belt 3 determine univocally the speed of advance of the articles A by their speed of movement.

The outer surface of the continuously-moving accumulator belt 5, on the other hand, is made of a material (for example polyurethane) which enables the articles A to slide freely on the surface of its upper conveyor pass.

The speed of the motor 12 is regulated so that the speed V" (continuous) of advance of the articles A on the belt 5 is, for example, of the order of 2–3 $V_m$, representing the average speed of the chain 2. This also means that speed V" is sure to be greater than the average speed of the belt 4 towards whose upstream end the belt 5 urges the articles A which are brought to its input substantially but not necessarily continuously (that is with the possible presence of separating intervals and gaps in the flow of articles A), the articles A thus accumulating and being packed together between the downstream end of the belt 5 and the upstream end of the batching belt 4, which moves intermittently, copying the movement of the chain 2.

Naturally, the ability of the articles A to slide on the belt 5 enables them to accumulate or form a queue without arching of the row of articles A.

The presence of the accumulation thus ensures that each time the belt 4 is advanced during the period $T_m$ to cause the advance of a number of articles A equal to the number of articles in each group to be taken up at the position P, the required number of articles A is sure to be situated upstream of the batching belt 4.

Naturally, the principle of the invention remaining the same, the forms of embodiment and details of construction may be varied widely with respect to those described and illustrated, without thereby departing from the scope of the present invention.

What is claimed is:

1. Apparatus for supplying a station, from a substantially but not necessarily continuous flow of articles, with groups of a predetermined number of said articles which, for a predetermined period of time, are substantially stationary in correspondence with said station, said apparatus comprising:
   a conveyor line for said articles, which extends in correspondence with said station and has respective positions for receiving said articles;
   drive means associated with said conveyor line which can cause its intermittent movement with a condition in which said conveyor line is substantially stationary for said predetermined period and a condition of movement in which said conveyor line is advanced by a number of said receiving positions equal to said number of articles in said groups,
   a conveyor for batched supply of said predetermined number of articles to said conveyor line, the conveyor being adapted for intermittent motion which copies the intermittent motion of said conveyor line,
   means for linking the movement of said conveyor to that of said conveyor line so as to regulate the supply to articles to the receiving positions of the conveyor line itself, and
   a unit for accumulating said articles located upstream of said conveyor for generating, from said flow of articles, an accumulation of articles which are supplied continuously to said conveyor,
   wherein said conveyor line includes a first plurality of separate conveying elements arranged parallel to each other so as to define separating spaced between them and a spacer conveyor which is provided immediately upstream of said first plurality of separate conveying elements and is constituted by a second plurality of separate conveying elements arranged parallel to each other and extending, at least marginally, into said separating spaces.

2. Apparatus according to claim 1, wherein, in its condition of movement, said conveyor line is advanced for a period of time which is of longer duration than said predetermined period of time.

3. Apparatus according to claim 2, wherein in its condition of movement, said conveyor line is advanced for a period of time whose duration is at least three times said predetermined period of time.

4. Apparatus according to claim 1, wherein said conveyor for the batched supply of said articles is in the form of an endless belt.

5. Apparatus according to claim 1, wherein said movement-linking means include at least one optical sensor which can detect the passage of said articles on said conveyor for batched supply to said conveyor line.

6. Apparatus according to claim , wherein said spacer conveyor is movable with an intermittent movement which copies the movement of said first plurality of separate conveying elements of said conveyor line with an average speed which is faster than the average speed of said conveyor for the batched supply of said articles, so as to separate the articles which are advancing to said conveyor line.

7. Apparatus according to claim 6, wherein said spacer conveyor moves at an average speed which is approximately 1.3–1.4 times the average speed of said first plurality of separate conveying elements of said conveyor line.

8. Apparatus according to claim 6, wherein said spacer conveyor is in the form of an endless belt.

9. Apparatus according to claim 6, wherein a single motor is provided for moving said plurality of separate conveying elements of said conveyor line and said spacer conveyor and wherein a speed-multiplier device is interposed between said singe motor and said spacer conveyor.

10. Apparatus according to claim 6, wherein said at least one optical sensor is interposed between said conveyor for the batched supply of said articles and said spacer conveyor.

11. Apparatus according to claim 1, wherein said accumulating unit includes a further conveyor which is movable with continuous motion and said further conveyor transports said articles so that they can slide relative to said further conveyor.

12. Apparatus according to claim 11, wherein said further conveyor moves at a speed which is faster than the average speed of said conveyor for the batched supply of the articles.

13. Apparatus according to claim 11, wherein said further conveyor is in the form of an endless belt.

14. Apparatus according to claim 11, wherein said further conveyor moves at a speed of the order of 2–3 times the average speed of said conveyor line.

15. Apparatus according to claim 1, wherein at the upstream end of said conveyor line in the direction of movement of said articles, said first plurality of separate conveying elements pass around a first transmission assembly (13) and round a second transmission assembly (14).

16. Apparatus according to claim 15, wherein at a downstream end of said spacer conveyor, said second plurality of separate conveying elements pass around a third transmission assembly (15) positioned generally above said first transmission assembly and substantially coplanar with said second transmission assembly.

17. Apparatus according to claim 1, wherein, in a single operative configuration, said apparatus has an associated pick-up unit including the same number of gripping elements operating at the pick-up position as there are articles in each of said groups; said pick-up unit having an operating time whose duration is substantially equal to said predetermined period of time.

18. Apparatus according to claim 1, wherein said respective positions for receiving said articles are formed by nibs.

* * * * *

UNITED STATES PATENT AND TRADEMARK OFFICE
CERTIFICATE OF CORRECTION

PATENT NO. : 4,991,708            Page 1 of 2

DATED : February 12, 1991

INVENTOR(S) : Renzo Francioni

It is certified that error appears in the above-identified patent and that said Letters Patent is hereby corrected as shown below:

Abstract, line 8, change "operated" to -- operates --.

Column 1, line 45, after "rates" delete the comma.
Column 1, line 62, after "based" change "of" to -- on --.

Column 3, line 61, change "round" to -- around --.

Column 4, line 33, change "31" (second occurrence) to
                 -- 32 --.
Column 4, line 33, change "round" to -- around --.
Column 4, line 38, delete "thus".
Column 4, line 47, after "more" delete the "L".
Column 4, line 47, after "precisely" insert a comma.
Column 4, line 62, after "example" insert a comma, and after
                 "articles" delete the comma.

Column 5, line 52, Insert a comma after "particular".
Column 5, line 64, change "in-phase" to -- inphase --.
Column 5, line 64, change "see" to -- seen --.

Column 6, line 36, insert a comma after "example".
Column 6, lines 39,40, close the gap between the lines.
Column 6, line 42, change "univocally" to
                 -- unequivocally --.

Column 7, line 6, after "illustrated" delete the comma.

UNITED STATES PATENT AND TRADEMARK OFFICE
CERTIFICATE OF CORRECTION

PATENT NO. : 4,991,708                          Page 2 of 2
DATED      : February 12, 1991
INVENTOR(S): Renzo Francioni It is certified that error appears in the above-identified patent and that said Letters Patent is hereby corrected as shown below:

In the Claims

Column 7, line 33, after "supply" change "to" to -- of --.
Column 7, line 41, change "spaced" to -- spaces --.

Column 8, line 1, after "claim" insert -- 5 --.
Column 8, line 17, insert "first" after "said".
Column 8, line 20, change "singe" to -- single --.

Signed and Sealed this

Eighteenth Day of August, 1992

*Attest:*

DOUGLAS B. COMER

*Attesting Officer*      *Acting Commissioner of Patents and Trademarks*